No. 864,966. PATENTED SEPT. 3, 1907.
L. G. HAASE.
SCRAPER.
APPLICATION FILED JUNE 25, 1907.
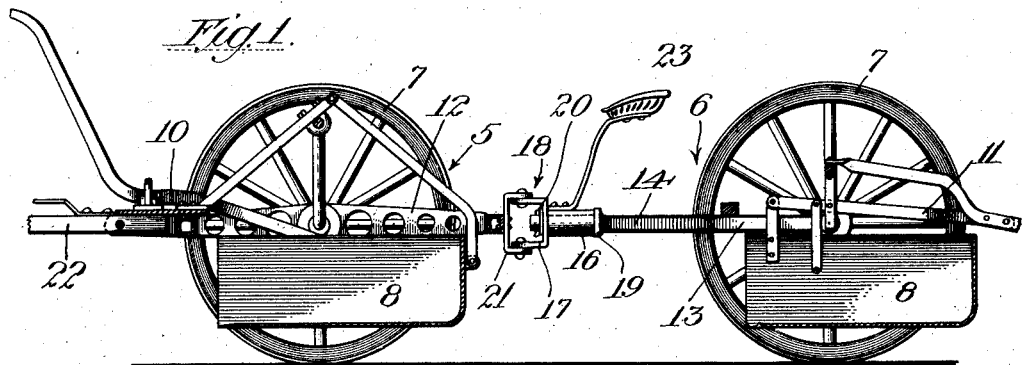
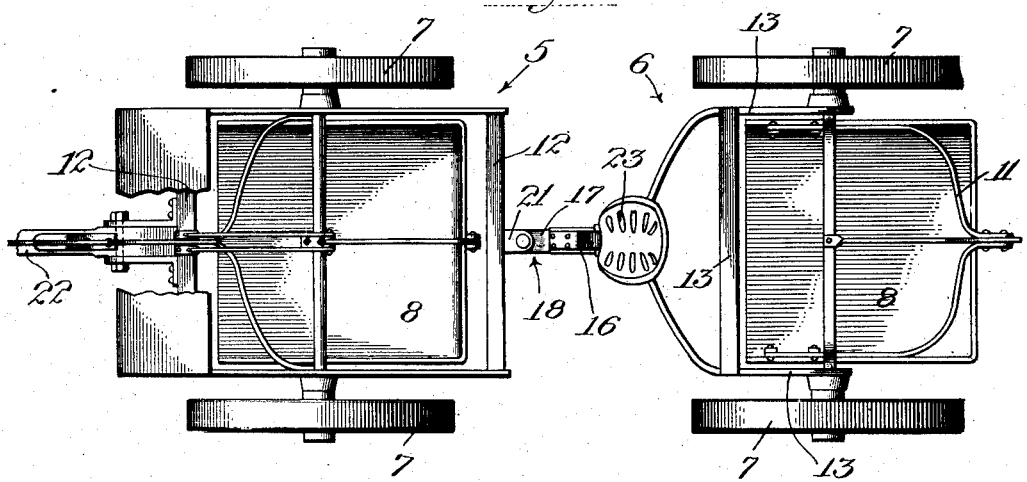
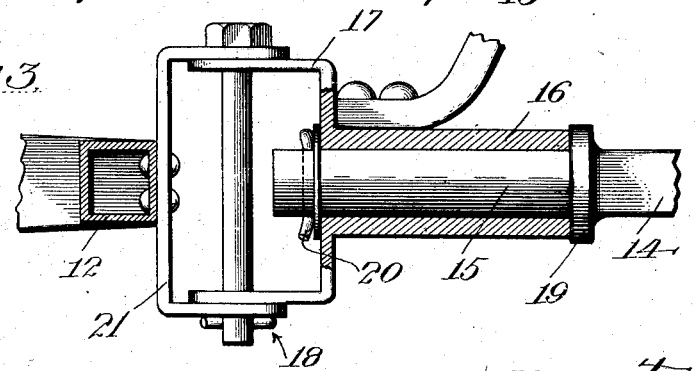
Witnesses:
Inventor.
Leo G. Haase,
By Attorneys.

UNITED STATES PATENT OFFICE.

LEO G. HAASE, OF PASADENA, CALIFORNIA.

SCRAPER.

No. 864,966.  Specification of Letters Patent.  Patented Sept. 3, 1907.

Application filed June 25, 1907. Serial No. 380,747.

*To all whom it may concern:*

Be it known that I, LEO G. HAASE, a citizen of the United States, residing at Pasadena, in the county of Los Angeles and State of California, have invented new and useful Improvements in Scrapers, of which the following is a specification.

My invention relates to a novel form of a wheeled truck adapted to carry a pair of scraper pans and the prime object thereof is to provide a truck construction with a hinged connection between the front and rear members thereof which will allow the two members to swing only in a horizontal direction and thereby permit the use of a pivoted tongue on the front member rather than one rigidly affixed thereto.

A further object is to provide an additional swivel joint between the two members which imparts to the truck a flexibility enabling it to traverse extremely rough surfaces.

I accomplish these objects by means of the device described herein and illustrated in the accompanying drawings in which:—

Figure 1:— is a sectional view of my improved scraper. Fig. 2:— is a plan view of the same. Fig. 3:— is a sectional detail of the joint connecting the two members of the truck.

Referring to the drawings, 5 and 6 designate the front and rear truck members of my improved scraper both equipped with wheels 7 and adapted to carry scraper pans 9 manually operated by mechanisms 10 and 11 respectively. Members 5 and 6 are provided with frames 12 and 13 respectively, rear member 6 being in all respects similar to the wheeled scraper of usual construction while forward member 5 is provided with a specially constructed frame, the object of which will appear hereinafter.

Frame 13 of rear member 6 is provided with a short pole 14 which is round on its forward end as at 15 and adapted to fit into sleeve 16 rigidly secured to member 17 of hinge 18. A collar 19 and a pin 20 prevent longitudinal movement of the pole in the sleeve. The other member 21 of hinge 18 is rigidly secured to frame 12 of forward member 5 which frame extends rearwardly around the scraper pan for this purpose. Spring seat 23 is mounted on sleeve 16 for the driver of the scraper.

It is manifest from the drawings that hinge 18 will allow of perfect freedom in horizontal relative movement of the two members of the truck while the swivel connection will allow of perfect flexibility without permitting the two members to move vertically out of their proper relative positions. Thus it will be observed that the truck acts to all intents and purposes exactly as a four wheeled wagon truck with the added advantage of being flexible.

By means of coupling the two members together in the manner described I am enabled to utilize a loose tongue 22 on the forward member in place of the rigidly secured tongue which is usually used on scrapers. In this manner I am enabled to remove all extra and unnecessary weight from the necks of the horses drawing the scraper as only the weight of the tongue need be supported by them. This arrangement also adds to the flexibility of the truck as the tongue is not forced up and down by the movements of the truck in passing over rough surfaces.

It is apparent that I have produced a scraper which is much easier on the horses drawing the same and therefore much more efficient in transporting material than the scraper now in use in which a great part of the weight of the material carried is placed on the horses' necks. It is further made manifest that I have not sacrificed any flexibility of the truck in attaining this desired end as the swivel connection provides for passage over the rough surfaces on which trucks of this class are used.

Having described my invention what I claim as new and desire to secure by Letters Patent is:—

1. In a scraper of the class described, a forward member, a rear member, a horizontally swinging hinge connection between said members, and a tongue pivotally secured to said forward member.

2. In a scraper of the class described, a forward member, a rear member, a horizontally swinging hinge connection between said member, one of said members being connected to said hinge by a swivel joint, and a tongue pivotally secured to said forward member.

3. In a scraper of the class described, a forward wheeled member, a rear wheeled member, each of said members being provided with a scraper pan and operating mechanism therefor, a horizontally swinging hinge connection between said members, one of said members being rigidly connected to said hinge and the other being connected thereto through a swivel joint, and a draft tongue pivoted on the front end of said forward member.

4. In a scraper composed of two members, means to connect the members together comprising a hinge rigidly secured to one of said members and to a swivel joint, said swivel joint being secured to the other of said members.

In witness that I claim the foregoing I have hereunto subscribed my name this 17th day of June, 1907.

LEO G. HAASE.

Witnesses:
TRIMBLE BARKELEW,
EDMUND A. STRAUSE.